(12) United States Patent
Matsuto et al.

(10) Patent No.: US 7,760,963 B2
(45) Date of Patent: Jul. 20, 2010

(54) IMAGE PROCESSING METHOD, IMAGE PROCESSING DEVICE AND RECORDING MEDIUM ON WHICH IMAGE PROCESSING PROGRAM IS RECORDED

(75) Inventors: Takayuki Matsuto, Niigata (JP); Kohei Akazawa, Niigata (JP); Shin-ichi Toyabe, Niigata (JP); Tatsuo Ushiki, Niigata (JP)

(73) Assignee: Niigata University, Niigata (JP)

( * ) Notice: Subject to any disclaimer, the term of this patent is extended or adjusted under 35 U.S.C. 154(b) by 580 days.

(21) Appl. No.: 11/569,866

(22) PCT Filed: Dec. 7, 2005

(86) PCT No.: PCT/JP2005/022459

§ 371 (c)(1), (2), (4) Date: Dec. 22, 2006

(87) PCT Pub. No.: WO2006/073037

PCT Pub. Date: Jul. 13, 2006

(65) Prior Publication Data

US 2008/0292208 A1 Nov. 27, 2008

(30) Foreign Application Priority Data

Jan. 7, 2005 (JP) ............................. 2005-003130

(51) Int. Cl.
*G06K 9/40* (2006.01)
(52) U.S. Cl. ...................... 382/275; 382/260; 382/274; 382/282
(58) Field of Classification Search ................. 382/260, 382/274, 275, 282
See application file for complete search history.

(56) References Cited

U.S. PATENT DOCUMENTS

| 5,497,249 | A | 3/1996 | Koizumi et al. | |
| 5,822,466 | A | 10/1998 | Morfill et al. | |
| 6,817,982 | B2 * | 11/2004 | Fritz et al. | 600/443 |
| 7,045,255 | B2 * | 5/2006 | Misaka | 430/5 |
| 7,250,248 | B2 * | 7/2007 | Misaka | 430/311 |
| 7,254,278 | B2 * | 8/2007 | Jung | 382/261 |

FOREIGN PATENT DOCUMENTS

| JP | 06-266839 A | 9/1994 |
| JP | 07-058959 A | 3/1995 |
| JP | 2001-143068 A | 5/2001 |
| JP | 2003-091724 A | 3/2003 |
| WO | WO-94/28500 A1 | 12/1994 |

* cited by examiner

*Primary Examiner*—Yosef Kassa
(74) *Attorney, Agent, or Firm*—McDermott Will & Emery LLC (57) ABSTRACT

A method employing a statistic means to test whether or not luminance signals around a point of interest are distributed according to the same probability distribution with respect to luminance signals of respective pixels constituting the image; determining a range where the same probability distribution can be regarded as being satisfied, estimating the true luminance value of the point of interest by using the luminance data of the range. Especially when the image signals are faint to such an extent that the intensity of the luminance signal is based on the Poisson distribution, it is effective to perform a smoothing processing for each of the probability distributions of the signals and the noises by a test of a uniformity of the Poisson distribution, enabling a clear and denoised image to be obtained.

12 Claims, 5 Drawing Sheets

IMAGE PROCESSING METHOD, IMAGE PROCESSING DEVICE AND RECORDING MEDIUM ON WHICH IMAGE PROCESSING PROGRAM IS RECORDED

CROSS-REFERENCE TO PRIOR APPLICATIONS

This is a U.S. national phase application under 35 U.S.C. §371 of International Patent Application No. PCT/JP2005/022459 filed Dec. 7, 2005 and claims the benefit of Japanese Application No. 2005-003130 filed Jan. 7, 2005. The International Application was published in Japanese on Jul. 13, 2006 as International Publication No. WO 2006/073037 under PCT Article 21(2) the content of which is incorporated herein in its entirety.

TECHNICAL FIELD

The present invention pertains to an image processing method, more specifically to an image processing method for obtaining a clear image produced by removing noises from an image comprising faint signals.

One example of the images comprising faint signals is one obtained in the case of staining a specific base sequence of DNA present in a chromosome with a fluorescent dye to observe the DNA by a scanning near-field optical/atomic force microscope. When irradiating exciting light to the fluorescent dye to detect the light emitted, increasing an image resolution power leads to a reduced S/N ratio of the image because the number of photons per pixel is so small as several to several dozens. As a result, pepper-and-salt noise patterns can be seen over the length and breadth of the image.

In general, as a method for removing noises, a method for smoothing signals in the neighboring region of each pixel is available. A moving average method, a Gaussian-filter method, a median-filter method and so on are generally available as the conventional smoothing methods. In the moving average method, however, a smoothing quality varies depending on the number of neighboring pixels to be taken in averaging. If the neighboring pixels are taken in large number, a boundary line of a target signal becomes blurred, whereas if in small number, noises remain.

In the Gaussian-filter method as well, a weighted average method is implemented by weighted averaging according to the Gaussian distribution with neighboring pixels of the pixel of interest included, and thus a boundary line of a target signal becomes also blurred if the neighboring pixels are adopted in large number, whereas noises still remain if adopted in small number. Similarly, the same problem as described above occurs in the median-filter method, because a median value of signals in neighboring pixels of a pixel of interest is adopted as a signal of the pixel of interest, and hence the smoothing quality is varied depending on the number of the neighboring pixels to be taken for the pixel of interest. If the neighboring pixels are taken in large number, a boundary line of a target signal becomes blurred, whereas if in small number, noises remain.

According to the above-described smoothing method, it is necessary to preliminary determine the number of neighboring pixels to be taken for a pixel of interest, and denoising effect varies depending on target images and hence the appropriate number of the neighboring pixels is difficult to determine.

As an alternative method, one method is disclosed in which a noise standard deviation is expected in advance, and if the absolute value of the difference between the value of the neighboring pixel and the value of the pixel of interest is less than a numerical constant set to two times the expected noise standard deviation, then the value of the neighboring pixel replaces the original value of the pixel of interest (see Patent Document 1). This method does not require preliminarily determining the number of the neighboring pixels to be taken for the pixel of interest, yet it is necessary to expect the noise standard deviation in advance. Consequently, this method has a drawback that if the standard deviation is expected to be large, an image will lose its clearness, whereas if expected to be small, the noise reduction will become ineffective.

Further, another method is proposed, in which the processing is executed such that all pixel signals on an image are converted into binary data to extract edges from each of image data in each bit and the image data of lower-order bits than a bit specified when the number of the edges extracted is found to be less than a predetermined value are determined as noises that are to be removed or to be replaced by a certain value (see Patent Document 2). This method is effective only when the noise level is low and is uniform approximately over the length and breadth of the image.

Besides, it is generally known that a low-pass filter processing to remove high-spatial-frequency components may be applied to such noises that are scattered in fines over the length and breadth of an image. According to this process, however, there is a possibility that even true components among the high-spatial-frequency components may be deleted together with the noise components. Further, depending on which cutoff frequency is employed, the image obtained sometimes becomes blurred and/or the noises are insufficiently removed.

Patent Document 1: Japanese Unexamined Patent Publication No. 2001-143068

Patent Document 2: Japanese Unexamined Patent Publication No. 2003-91724

SUMMARY OF THE INVENTION

It is an object of the present invention to provide a method and a device capable of obtaining a clear image by removing noises without the need for setting the above-mentioned parameters, such as a neighboring area size, an expected noise level and a cutoff frequency. It is another object of the present invention to provide a computer-readable recording medium on which an image processing program according to the method is recorded.

According to a first aspect of the present invention, there is provided an image processing method having the steps of:

implementing a test by a statistical means to determine whether or not luminance signals around a point of interest are distributed according to the same probability distribution as that of the point of interest with respect to luminance signals of respective pixels constituting the image;

determining a test region where the luminance signals can be regarded as being distributed according to the same probability distribution and then defining said test region as a neighboring region; and estimating a true luminance value of said point of interest from luminance data of each pixel belonging to said neighboring region.

In the first aspect of the invention, noises are not judged by a threshold value of a certain constant. Due to the luminance signal of a pixel having a stochastic fluctuation, if the luminance signal in a certain region can be regarded as following the same probability distribution by testing whether it follows the same probability distribution or not, the region is determined as a range of the fluctuation to successively expand the region, thereby providing a method for determining the range of a uniformity of the distribution. Thus, the image processing method can be provided. Consequently, there is no need to preset the size of a neighboring region, thereby allowing for obtaining a noise-reduced clear image.

According to a second aspect of the present invention, there is provided an image processing method, including the steps of:

implementing a test by a uniformity of the Poisson distribution to determine whether or not luminance signals around a point of interest are distributed according to the same probability distribution as that of the point of interest with respect to luminance signals of respective pixels constituting the image;

determining a test region where the luminance signals can be regarded as being distributed according to the same probability distribution and then defining said test region as a neighboring region; and estimating a true luminance value of said point of interest from luminance data of each pixel belonging to said neighboring region.

When pixel signals and noise signals are so extremely faint as to be at a level where the number of photons ranging from only several to several dozens is detected, intensities of luminance signals are in a discrete state. In such a case, the intensities of the luminance signals are regarded as following the Poisson distribution. Accordingly, the point of interest and its neighboring region that is regarded as following the same probability distribution can be estimated by applying a likelihood ratio test. As a result, a noise-reduced clear image can be obtained by implementing the process even if the image signals are faint.

According to a third aspect of the present invention, there is provided an image processing method according to the first or second aspect, in which when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

When a difference between true luminance values of the point of interest and surrounding pixels is small, a type II error may occur. However, if the average value of the observed values has exceeded or fallen short of the predetermined confidence limit value when the test range has been expanded, the size of the tested range at that time is rejected to set the last tested range as the neighboring region, thus being capable of restraining the type II error.

According to a fourth aspect of the present invention, there is provided an image processing device having:

a means for implementing a test using a statistical method to determine whether or not luminance signals around a point of interest are distributed according to the same probability distribution as that of the point of interest with respect to luminance signals of respective pixels constituting the image;

a means for determining a test region where the luminance signals can be regarded as being distributed according to the same probability distribution and then defining said test region as a neighboring region; and a means for estimating a true luminance value of said point of interest from luminance data of each pixel belonging to said neighboring region.

According to a fifth aspect of the present invention, there is provided an image processing device including:

a means for implementing a test by a uniformity of the Poisson distribution to determine whether or not luminance signals around a point of interest are distributed according to the same probability distribution as that of the point of interest with respect to luminance signals of respective pixels constituting the image;

a means for determining a test region where the luminance signals can be regarded as being distributed according to the same probability distribution and then defining said test region as a neighboring region; and a means for estimating a true luminance value of said point of interest from luminance data of each pixel belonging to said neighboring region.

According to a sixth aspect of the present invention, there is provided an image processing device according to the fourth or the fifth aspect, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

According to a seventh aspect of the present invention, there is provided a computer-readable recording medium on which an image processing program is recorded, wherein said image processing program has the steps of:

implementing a test by a statistical means to determine whether or not luminance signals around a point of interest are distributed according to the same probability distribution as that of the point of interest with respect to luminance signals of respective pixels constituting the image;

determining a test region where the luminance signals can be regarded as being distributed according to the same probability distribution and then defining said test region as a neighboring region; and estimating a true luminance value of said point of interest from luminance data of each pixel belonging to said neighboring region.

In order to implement the image processing method of the foregoing first aspect using a common computer, the image processing program is provided in the form of a computer-readable recoding medium. As a result, the image processing program is so convenient that a noise-reduced clear image can be obtained both online and offline.

According to an eighth aspect of the present invention, there is provided a computer-readable recording medium on which an image processing program is recorded, wherein said image processing program having steps of:

implementing a test by a uniformity of the Poisson distribution to determine whether or not luminance signals around a point of interest are distributed according to the same probability distribution as that of the point of interest with respect to luminance signals of respective pixels constituting the image;

determining a test region where the luminance signals can be regarded as being distributed according to the same probability distribution and then defining said test region as a neighboring region; and estimating a true luminance value of said point of interest from luminance data of each pixel belonging to said neighboring region.

In the case of image signals comprising faint signals in which intensities of luminance signals are regarded as following the Poisson distribution, it is effective to discriminate a region of true image signals from a region of noises by the test of the Poisson distribution to implement the smoothing processing with different parameters for each of the regions, thereby leading to a remarkable effect of obtaining a noise-reduced clear image.

According to a ninth aspect of the present invention, there is provided a computer-readable recording medium according to the seventh or eighth aspect, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

According to the present invention, it is tested by a statistical method whether luminance signals around a point of interest are distributed according to the same probability distribution as that of the point of interest or not, with respect to luminance signals of the respective pixels constituting an image, to thereby determine a region where the luminance signals can be regarded as being distributed according to the same probability distribution and then the data within the region are smoothed. Hence, such effects are exerted that there is no need to preliminarily set parameters such as a size of a neighboring region and thus a noise-reduced clear image is obtainable.

BEST MODE FOR CARRYING OUT THE INVENTION

In an image comprising faint signals, noises with paper-and-salt patterns often appear over the length and breadth of the image to thereby make it difficult to view the image. Such noises have heretofore been reduced generally by using smoothing methods such as moving average method and/or appropriate filtering method. The resultant image, however, often remains unclear.

Hereunder is a detailed description of an image processing method according to the present invention with reference to appended drawings.

Figure 1:
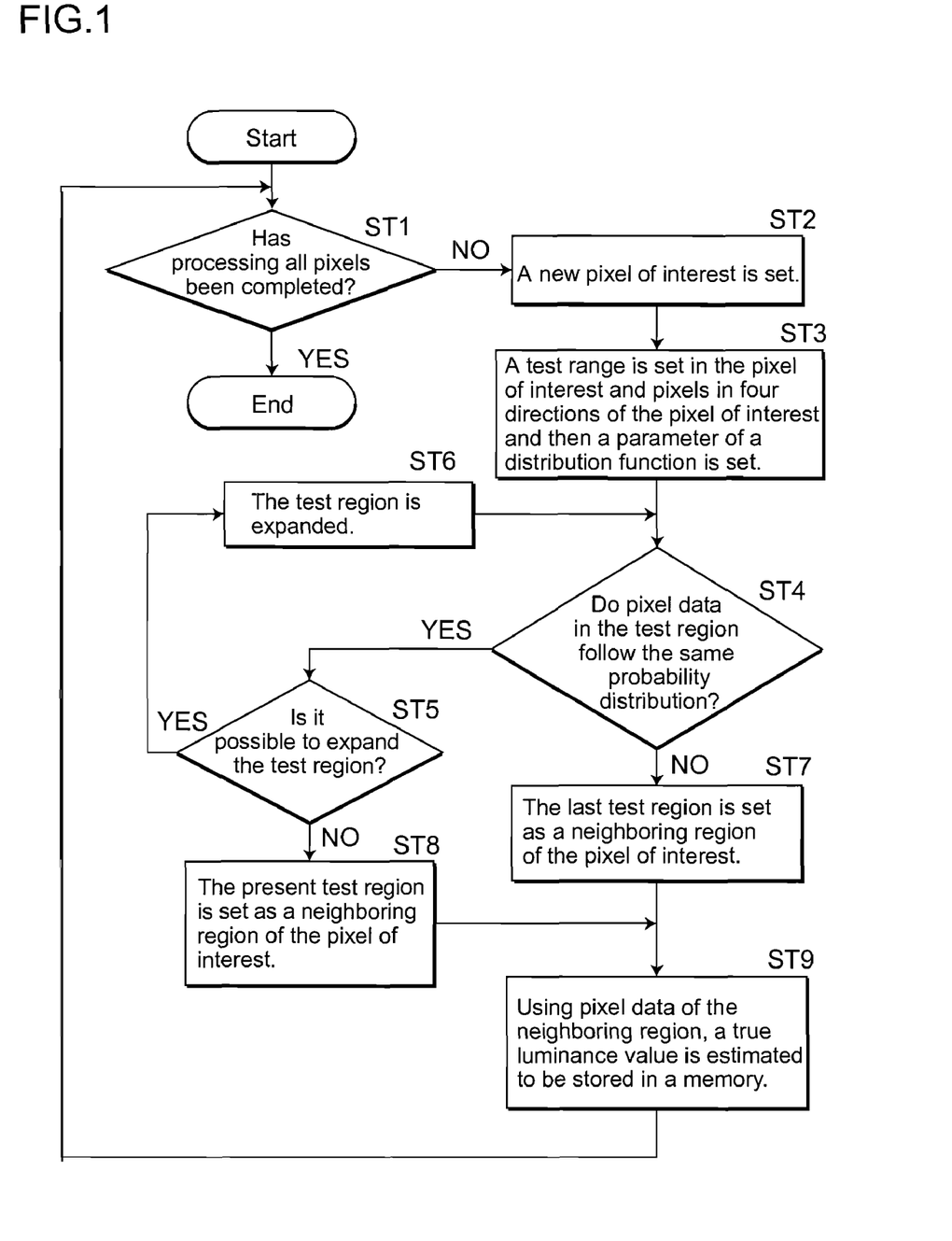
FIG. 1 is a flowchart illustrating a general outline of an image processing method according to the present invention.

FIG. 1 is a flowchart illustrating an outline of the image processing method according to the present invention. In step ST1 shown in FIG. 1, it is determined whether processing of all the pixels in the image that are to undergo the image processing has been completed or not. If not completed yet, a new pixel of interest is set in step ST2. In an initial condition, no pixel has undergone the image processing yet, and hence the image processing advances from the step ST1 to the step ST2, and a certain pixel such as the one located at a left-hand corner of the image is set as a pixel of interest.

Figure 2A:
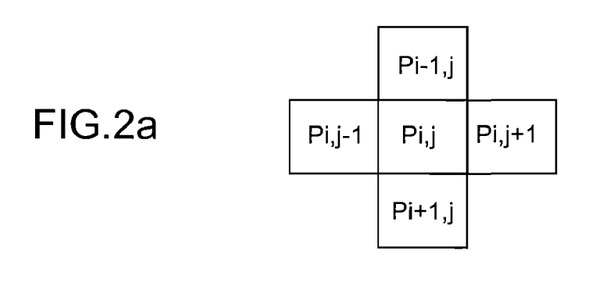
FIGS. 2a-2c are explanatory diagrams illustrating a test region expanding method according to the present invention.

In step ST3, it is assumed that signal intensity $I_{i,j}$ of an initial pixel of interest $P_{i,j}$ and those of $I_{i-1,j}$, $I_{i+1,j}$, $I_{i,j-1}$, $I_{i,j+1}$ that are signals of pixels ($P_{i-1,j}$, $P_{i+1,j}$, $P_{i,j-1}$, $P_{i,j+1}$) at peripheral four sides as shown in FIG. 2a have a certain probability distribution, e.g., a Poisson distribution, and thus a distribution function is set with its parameter $\lambda$ defined as an average value of the five signals described above.

In step ST4, it is tested whether or not the intensities of the five signals described above are in accordance with the distribution function at a suitable significance level, e.g., at a 99% level of confidence. Namely, in the present embodiment, the test is implemented, using a pixel range shown in FIG. 2a as an initial range of the test range. The test implemented here is a so-called uniformity test of the Poisson distribution and is implemented using a likelihood ratio. It is assumed that the number of photons observed in each pixel varies stochastically while being based upon the Poisson distribution (Poisson noises), depending on a true luminance value $\lambda$. In this case, a probability at which an observed value x can be found is expressed by a formula 1 and only a value of $\lambda$ determines the probability distribution.

$$p(x) = \frac{e^{-\lambda}\lambda^x}{x!} \quad (1)$$

In a pixel region shown in FIG. 2a, it is assumed that the numbers of the photons $x_1, x_2, \ldots, x_n$ were observed in the pixel of interest $P_{i,j}$ and the neighboring pixels thereof. A subscript "n" denotes the number of pixels. In FIG. 2a, n=5 and $x_1, x_2, x_3, x_4$, and $x_5$ correspond to $P_{i,j}$, $P_{i-1,j}$, $P_{i,j-1}$, $P_{i,j+1}$, and $P_{i+1,j}$, respectively. If "the true luminance values $\lambda$ of these n pieces of pixels are assumed to be an identical value" (hereinafter called a hypothesis 1), the maximum-likelihood estimator of $\lambda$ is expressed by a formula 2.

$$\lambda = \sum_{i=1}^{n} x_i / n \quad (2)$$

Inversely, if "each pixel is assumed to have a different true luminance value $\lambda_i$," (a hypothesis 2), an estimator of the true luminance value of each pixel is given as $\lambda_i = x_i$, where i=1, 2, ..., n (since there is no information other than an observed value). Each assumed likelihood ratio is calculated by the following formula 3.

$$\Lambda = \frac{\text{likelihood of the assumption 1}}{\text{likelihood of the assumption 2}} = \frac{\prod_{i=1}^{n} p(x_i; \lambda = t/n)}{\prod_{i=1}^{n} p(x_i; \lambda_i = x_i)} = \frac{\prod_{i=1}^{n} e^{-t/n}(t/n)^{x_i}/x_i!}{\prod_{i=1}^{n} e^{-x_i} x_i^{x_i}/x_i!} \quad (3)$$

where t denotes the sum of the observed values and is expressed as:

$$t = \sum_{i=1}^{n} x_i \quad (4)$$

It is generally known that when t/n (an average value) is large (e.g., t/n>5), −2 times a logarithmic value of the likelihood ratio which is expressed by a formula 5 approximately accords with an chi-square distribution of a degree of freedom (n−1).

$$-2\log\Lambda = -2\log\left(\frac{\prod_{i=1}^{n}e^{-t/n}(t/n)^{x_i}/x_i!}{\prod_{i=1}^{n}e^{-x_i}x_i^{x_i}/x_i!}\right) = 2\left(\sum_{i=1}^{n}x_i\log x_i - t\log(t/n)\right) \quad (5)$$

Accordingly, a statistics of the formula (5) is calculated to compare the value calculated with a value at a significant level in the chi-square distribution and thus the hypothesis that "the true luminance values of the n pieces of pixel are identical" can be tested. On the other hand, when t/n is small (e.g., t/n≦5), every possible combination of $x_1, x_2, \ldots, x_n$ (integers not less than 0) for the values of n and t is produced to implement the test by calculating respective probabilities using the Fisher method. At that time, a critical value table of the above-mentioned statistics (a reference table) may be created on a memory for example, to use the table for the test. As the result of the test described above, if the uniformity of the distribution is not rejected, the flow of the image processing advances to the next step ST5.

In the step ST5, it is judged whether a preset maximum test range has been reached or not, and if not reached, then the flow advances to step ST6, while if reached, to step ST7.

Figure 2B:
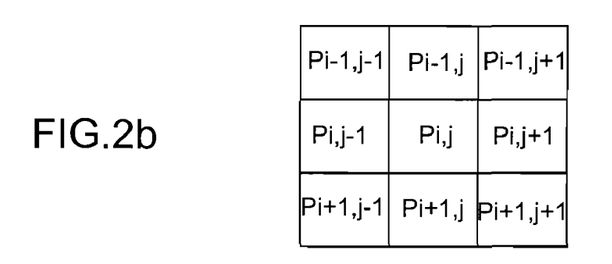
Figure 2C:
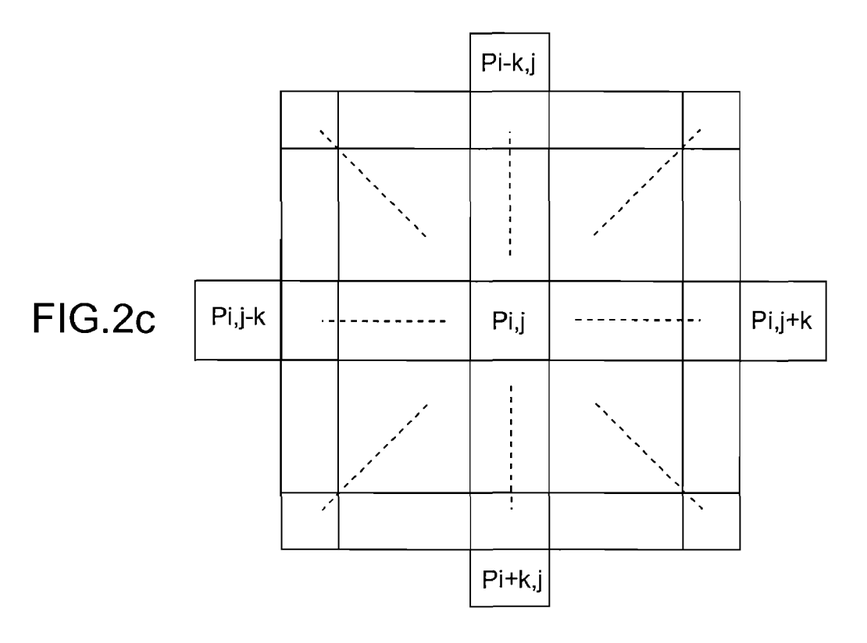

In the step ST6, as shown in FIG. 2b, the test region is expanded from the pixel region in FIG. 2a toward four directions to set a distribution function with nine signals, and then returns to the step ST4, where the same test as implemented last is done. If the uniformity of the distribution is not rejected as a result of the test in the step ST4, then the test region is further expanded in the steps ST5, ST6. In other words, in the steps ST4 to ST6, in order to optimize the neighboring region, an initial region of the test region is limited to the pixels (of the left, right, top and bottom) nearest to the pixel of interest, and the test is repeated while expanding the test region until the test is rejected. When such operations are repeated until the test region has reached a certain size as shown in FIG. 2c, and if the uniformity of the distribution is rejected at that time, then the flow advances to the step ST7, where a test region just before the test is rejected is regarded as an optimal (maximal) neighboring region of the pixel of interest, which is a set of the pixels in accordance with a distribution function at that time, to thereby set the same as a neighboring region that is to undergo a hereinafter-described averaging processing. In the meantime, the neighboring region expanding method of the invention should not be limited to the foregoing one, but any suitable expanding methods may be employed, such as a method for expanding in one or two directions, a spirally expanding method, etc. The fact that "the test of the uniformity of the Poisson distribution is not rejected" means that the true luminance values of these points do not substantially differ. Hence, the true luminance value of the pixel of interest can be estimated using the observed values of these points by average or weighted average. In general, the larger the number of the observed values "n" used for the averaging is, the higher the degree of precision in estimation becomes, and thus the maximal neighboring region for each pixel is estimated by using a sequential test.

In step ST8, the present test region is set as the neighboring region of the pixel of interest.

In step ST9, the true luminance value of the pixel of interest is estimated using pixel data of the neighboring region and a parameter (an estimated value of the true luminance value of the point of interest) of a distribution function at that time is stored in a memory. In order to estimate the true luminance value of the pixel of interest, the smoothing processing may be implemented to the pixel data of the neighboring region. As the averaging process, any well-known smoothing processing such as the moving average filter method, the weighted average filter method are adoptable.

When the step ST9 has been completed, the flow returns to the step ST1 again, where it is determined whether all pixels targeted for the image processing have been completed or not. If not, a new pixel of interest is set at the next point in the step ST2.

As described above, the procedures from the step ST2 to the step ST9 are repeated until the processing of all the pixels is completed.

Alternatively, as a modified example of the present invention, the following procedure may be implemented. Namely, when expanding the neighboring region by storing the determined neighboring region and the parameter of the distribution function corresponding to the determined neighboring region in an image memory, if a second region (another neighboring region) whose distribution function has already been determined is reached, the neighboring region may be set so as to avoid the second region. Thus way, for all pixels, there may be obtained a plurality of neighboring regions with distribution functions having different parameters along with those parameters, so that the smoothing processing may be implemented for each of the neighboring regions to store the smoothed data thus obtained in the image memory. In the smoothing processing, weighting may be applied to each of the neighboring regions, using weighting functions different from one another.

In the case that the number of data "n" is small, and there is only a little difference between the true luminance values of a pixel of interest and pixels around the pixel of interest, so-called a type II error is likely to occur, said type II error being the one that a test is not rejected although the true luminance value differs. For this reason, using a confidence limit value calculated from an observed value of the nearest pixels, the type II error is restrained. If the sum of signal values is denoted by t and the number of points by n (n=5 in the pixel region shown in FIG. 2a), the confidence limit value described here is calculated as $$\text{Upper confidence limit value} = \frac{1}{2n}\chi_\alpha^2(2(t+1)) \quad (6)$$

$$\text{Lower confidence limit value} = \frac{1}{2n}\chi_{1-\alpha}^2(2t)$$

More specifically, when the test region is expanded in the step ST4, if an average value of the observed values exceeds or falls short of these confidence limit values, the expanded test region may be rejected to set the last tested region as the neighboring region.

The above-described image processing method is realized in an image processing program as an image processing algorithm, which is then installed in a computer through a recording medium or a telecommunication line such as the Internet or the like, whereby there can be provided an image processing device whose image processing program permits the computer to function as a means for practicing each procedure of the image processing method. Also by mounting a circuit that realizes the image processing algorithm directly on various processing equipments such as a general-purpose microcomputer, a dedicated LSI or the like, the image processing device of the invention can be provided. Alternatively, results of the processing by the image processing program in an ASP server may be supplied to a client computer through the Internet.

The image information may be displayed on a display unit and/or printed by a printer. Further, the image information may be transmitted through a communications network so as to be able to use the same for other applications, as well.

FIRST EXAMPLE

Now, an example of a simulation as a first example of the present invention is described with reference to FIG. 3, which illustrates a comparison between an image obtained by allowing an image including dotted paper-and salt noises on a true image signal to undergo the image processing method of the present invention and comparative images obtained by allowing the same to undergo conventional smoothing processing methods commonly available in the past.

Figure 3A:
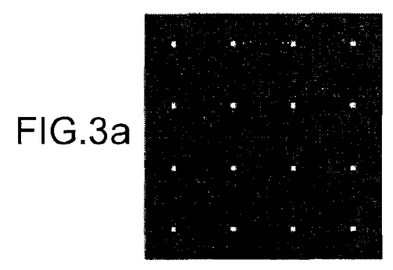
FIGS. 3a-3f are explanatory diagrams illustrating a first example of the present invention.
Figure 3B:
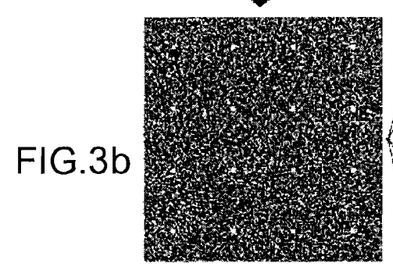

FIG. 3a denotes the intact true image signals, while FIG. 3b denotes an image produced stochastically from the intact image signals of FIG. 3a and thus the pepper-and-salt noises could be observed on the image. Then, the image shown in FIG. 3b was taken as a sample image to undergo the respective image processing.

Figure 3C:
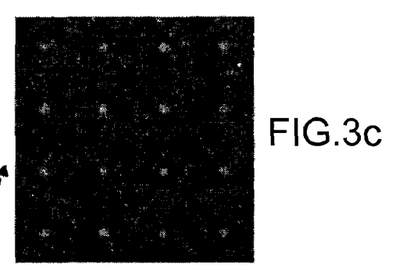

FIG. 3c denotes an image obtained by allowing the sample image to undergo a smoothing processing, using a Gaussian filter. Although background noises remained, borderlines of the intact true image signals were blurred and unclear.

Figure 3D:
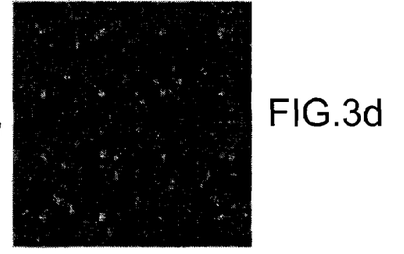

FIG. 3d denotes an image obtained by the smoothing processing, using a median filter. In the image, large-noise-level portions remained, and there could be seen some portions where a part of the intact true image signals dropped.

Figure 3E:
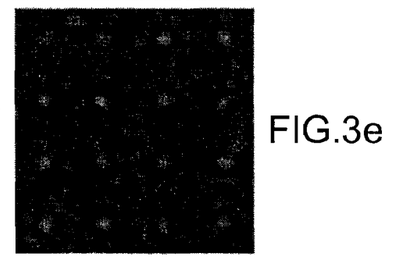

FIG. 3e denotes an image obtained by the smoothing processing, using a low-pass filter. In the image, both the intact image signals and the noise signals had their high-frequency components removed in terms of a space frequency, the resultant image was unclear as a whole. Particularly, in cases where the intact image signals comprise small dots and/or lines as seen in this example, a signal level deteriorates, leading to a significant fall in image quality.

Figure 3F:
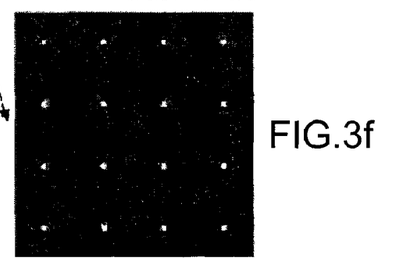

FIG. 3f denotes an image obtained by the image processing according to the present invention, where a background noise level became uniform, and clear and true image signals were obtained. This is because a region of the intact image signals was discriminated from a region of noises by a test, as following different probability distributions, respectively and hence the smoothing processing can be implemented with different parameters for each of the regions of the intact image signals and the noises. In this case, if the probability distribution of the region of the noises follows the Poisson distribution of a parameter $\lambda_n$, the signals in the region are considered to be fluctuations based on the Poisson distribution of the parameter $\lambda_n$ and thus, all the signals in the region, for example, can be replaced by $\lambda_n$. Likewise, if the image signals in the region of the true image signals follow the Poisson distribution of the parameter $\lambda_S$, all the signals in the region can be replaced by $\lambda_S$, thus enabling the clearness of the image to be maintained.

SECOND EXAMPLE

Next is a description of a second example where the image processing method according to the present invention was applied to a FISH (Fluorescence In Situ Hybridization) image taken by an SNOM/AFM (Scanning Near-field Optical Microscopy/Atomic Force Microscopy).

Figure 4:
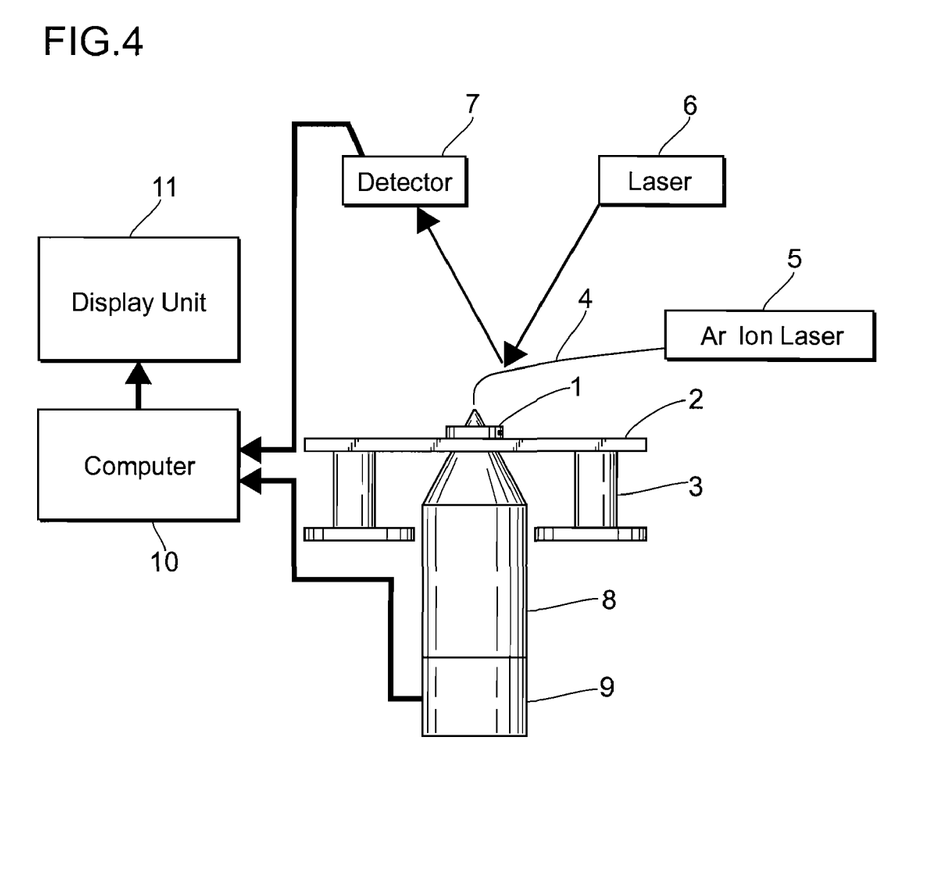
FIG. 4 is a schematic structure of a scanning near-field/atomic force microscope.

FIG. 4 shows a schematic structure of the scanning near-field optical/atomic force microscope (hereafter referred to as SNOM/AFM). This microscope is created by integrating the scanning near-field optical microscope with the atomic force microscope. In FIG. 4, a sample 1 was placed on a stage 2, which can perform scanning in X and Y directions by a scanner 3 utilizing the piezoelectric effect. A distal end of a cantilever 4 is arranged so extremely close to the sample 1 that the atomic force can work between itself and the sample 1, while light from Ar ion laser 5 is guided through an inside of the cantilever 4 so as to hit the sample 1. A rear surface of the cantilever 4 is irradiated with a laser beam 6 and the light reflected therefrom is detected by a detector 7, so that irregularities on a surface of the sample 1 can be detected. The function described above corresponds to that of the atomic force microscope.

When the light from the Ar ion laser 5 through the cantilever 4 is irradiated from a position extremely close to the sample 1, near-field light is emitted from the sample 1. The light is gathered by an objective lens 8 to detect the light using an optical detector 9 such as an APD (avalanche photodiode) and a PMT (electronic light amplifier). Signals detected by the detectors 7, 9 are input to a computer 10. This function corresponds to that of the scanning near-field optical microscope.

In this example, hybridized (In-Situ Hybridized) fragments of chromosome DNA stained with a fluorescent dye and having a specific sequence listing are employed as a sample. Accordingly, what is detected is not the near-field light emitted from the sample 1 but the light emitted by exciting the fluorescent dye by the light from the Ar ion laser 5. Optical signals thus detected are processed by the computer 10 together with control signals (not shown) of the scanner 3 to thereby produce a two-dimensional image. Further, this image is displayed on a display unit 11. The present example relates to the above-described image processing.

In the SNOM/AFM, there is no need to put a sample in a vacuum space unlike in an electron microscope and thus observation is possible in the ambient air under an atmospheric pressure. Hence, the SNOM/AFM is well-suited to observe biological samples such as the cells and chromosomes of a living organism and/or matters of which the desiccation causes a change of state.

An image, obtained by subjecting the fragments of chromosome DNA stained with a fluorescent dye to in-situ hybridization and then allowing the same to emit light by exciting the fluorescent dye, is called a FISH image. When the fluorescent dye is attached to the DNA in the chromosome, only the DNA that has a specific base sequence is stained with the fluorescent dye. This attachment operation, however, results in attaching the fluorescent dyes undesirably to its surrounding areas to leave some amount of the fluorescent dyes thereon. The light emitted from the fluorescent dye thus left generates noises. Further, a region excited by the Ar ion laser 5 is extremely minute and hence an emitted-light amount from the fluorescent dye ranges only from several photons to dozens of photons. Consequently, an image thus produced has a small S/N ratio and is formed from faint signals.

In FIG. 5 showing an image processing example of the FISH image processed by the SNOM/AFM, an image obtained by a commonly used smoothing processing is compared with an image obtained by the image processing according to the present invention. FIG. 5a denotes an original image of the FISH image.

Figure 5A:
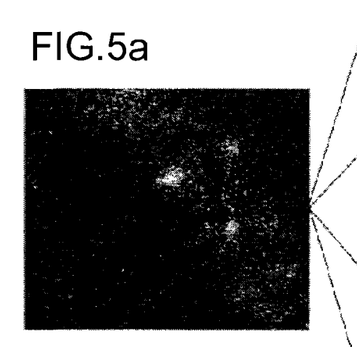
FIGS. 5a-5e are explanatory diagrams illustrating a second example of the present invention.
Figure 5B:
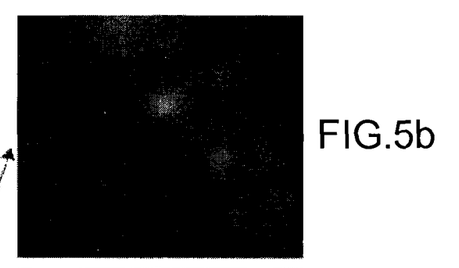

FIG. 5b is an image obtained by the smoothing processing, using a Gaussian filter. In the processing, a standard deviation of a neighboring pixel region to be weighted by the Gaussian distribution is 10. The image was so unclear as a whole that one could not tell whether noises had been removed or not.

Figure 5C:
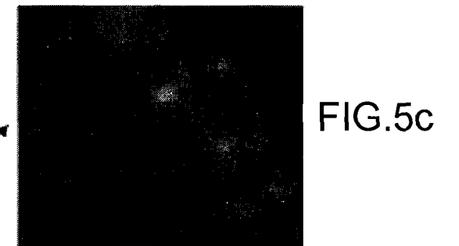

FIG. 5c is an image obtained by the smoothing processing, using a median filter. In the processing, a radius of the neighboring pixel region to implement the median process is 10. Low-noise portions seem to have been removed, but luminance values in the true image signal portions dropped so that the unclearness of borderline was resulted.

Figure 5D:
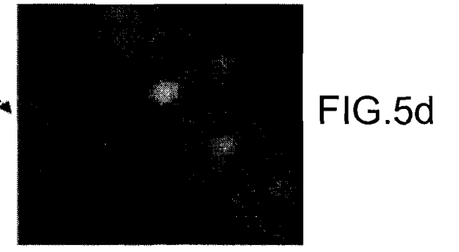

FIG. 5d denotes an image obtained the smoothing processing, using a low-pass filter. In the processing, 10 Hz was applied as a cutoff frequency. An unclear image was resulted in this case as well.

Figure 5E:
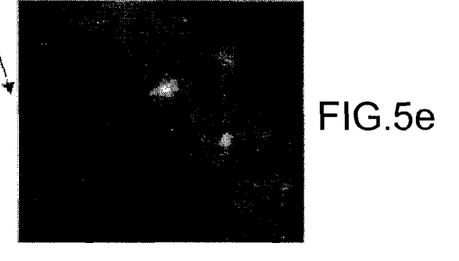

FIG. 5e denotes an image obtained by the image processing according to the present invention. In the image, there was no decrease in the luminance values in the true image signal portions with minute noises being reduced as a whole, and the clear borderlines were obtained. This is because a region of the true image signals was discriminated from a region of noises by a test, as following different probability distributions, respectively and hence the smoothing processing can be implemented with different parameters for each of the regions of the true image signals and the noises.

In the foregoing examples, the Poisson distribution was employed as the probability distribution of the image signals. As for the distribution function, however, the normal distribution, the Gaussian distribution, the binominal distribution and anyo other suitable distribution functions may be employed, respectively depending on a target image.

The present invention should not be limited to the foregoing embodiments and any partial modification and replacement that would be obvious to one skilled in the art shall be construed as being included in a scope of the invention.

The invention claimed is:

1. An image processing method, comprising the steps of:
   implementing a test by a statistical means to determine whether or not luminance signals around a point of interest are distributed according to the same probability distribution as that of the point of interest with respect to luminance signals of respective pixels constituting the image;
   determining a test region where the luminance signals can be regarded as being distributed according to the same probability distribution and then defining said test region as a neighboring region; and
   estimating a true luminance value of said point of interest from luminance data of each pixel belonging to said neighboring region.

2. An image processing method, comprising the steps of:
   implementing a test by a uniformity of the Poisson distribution to determine whether or not luminance signals around a point of interest are distributed according to the same probability distribution as that of the point of interest with respect to luminance signals of respective pixels constituting the image;
   determining a test region where the luminance signals can be regarded as being distributed according to the same probability distribution and then defining said test region as a neighboring region; and
   estimating a true luminance value of said point of interest from luminance data of each pixel belonging to said neighboring region.

3. The image processing method according to claim 1, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

4. An image processing device comprising:
   a means for implementing a test by a statistical method to determine whether or not luminance signals around a point of interest are distributed according to the same probability distribution as that of the point of interest with respect to luminance signals of respective pixels constituting the image;
   a means for determining a test region where the luminance signals can be regarded as being distributed according to the same probability distribution and then defining said test region as a neighboring region; and
   a means for estimating a true luminance value of said point of interest from luminance data of each pixel belonging to said neighboring region.

5. An image processing device comprising:
   a means for implementing a test by a uniformity of the Poisson distribution to determine whether or not luminance signals around a point of interest are distributed according to the same probability distribution as that of the point of interest with respect to luminance signals of respective pixels constituting the image;
   a means for determining a test region where the luminance signals can be regarded as being distributed according to the same probability distribution and then defining said test region as a neighboring region; and
   a means for estimating a true luminance value of said point of interest from luminance data of each pixel belonging to said neighboring region.

6. The image processing method according to claim 4, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

7. A computer-readable recording medium on which an image processing program is recorded, wherein said image processing program comprises steps of
   implementing a test by a statistical means to determine whether or not luminance signals around a point of interest are distributed according to the same probability distribution as that of the point of interest with respect to luminance signals of respective pixels constituting the image;
   determining a test region where the luminance signals can be regarded as being distributed according to the same probability distribution and then defining said test region as a neighboring region; and
   estimating a true luminance value of said point of interest from luminance data of each pixel belonging to said neighboring region.

8. A computer-readable recording medium on which an image processing program is recorded, wherein said image processing program comprises steps of
   implementing a test by a uniformity of the Poisson distribution to determine whether or not luminance signals around a point of interest are distributed according to the same probability distribution as that of the point of interest with respect to luminance signals of respective pixels constituting the image;
   determining a test region where the luminance signals can be regarded as being distributed according to the same probability distribution and then defining said test region as a neighboring region; and estimating a true luminance value of said point of interest from luminance data of each pixel belonging to said neighboring region.

9. The computer-readable recording medium according to claim 7, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

10. The image processing method according to claim 2, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

11. The image processing method according to claim 5, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

12. The computer-readable recording medium according to claim 8, wherein when said test region is expanded gradually from said point of interest toward a surrounding area, said expanded test region is rejected to set the last test region as said neighboring region if an average value of observed values for luminance signals of respective pixels belonging to said expanded test region exceeds or falls short of a given confidence limit value.

\* \* \* \* \*